(12) United States Patent
Monson et al.

(10) Patent No.: US 7,152,842 B1
(45) Date of Patent: Dec. 26, 2006

(54) USER COUPLED WORKSPACE SHOCK ISOLATION SYSTEM

(75) Inventors: Robert J. Monson, St. Paul, MN (US); Allen L. Arndt, Burnsville, MN (US); Samuel A. Runge, Forest, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/490,680

(22) Filed: Jan. 24, 2000

(51) Int. Cl.
*F16M 1/00* (2006.01)

(52) U.S. Cl. ...................... 248/678; 248/618

(58) Field of Classification Search ............... 248/618, 248/638, 678, 550, 634, 346.01; 108/57.12, 108/51.1, 51 R; 297/217.7, 174, 217.11, 297/217.3, 173, 157, 158.1; 472/102, 130; 52/167.1, 167.7, 220.1; 463/46, 47, 36, 30, 463/6; 273/148 B; 434/58, 55, 130; 267/113, 267/117, 136, 142–153, 166–170, 174, 178
See application file for complete search history.

(56) References Cited

U.S. PATENT DOCUMENTS

| | | | |
|---|---|---|---|
| 3,628,829 A * | 12/1971 | Heilig | 297/217.4 |
| 3,645,011 A * | 2/1972 | Callanen | 434/58 |
| RE29,123 E | 1/1977 | Malm et al. | 296/35 R |
| 4,066,256 A * | 1/1978 | Trumbull | 472/60 |
| 4,121,393 A * | 10/1978 | Renault et al. | 52/167.7 |
| 4,128,217 A | 12/1978 | Mazelsky | 244/122 R |
| 4,392,546 A | 7/1983 | Brown et al. | 180/326 |
| 4,463,818 A * | 8/1984 | Sonneborn | 180/89.15 |
| 4,478,407 A * | 10/1984 | Manabe | 472/60 |
| 4,565,039 A * | 1/1986 | Oguro et al. | 52/167.4 |
| 4,605,106 A | 8/1986 | Baker et al. | 188/374 |
| 4,892,051 A | 1/1990 | Taylor et al. | 114/1 |
| 4,978,320 A | 12/1990 | Chaplin et al. | 440/52 |
| 4,989,684 A | 2/1991 | Conway | 180/89.15 |
| 5,277,584 A * | 1/1994 | DeGroat et al. | 434/29 |
| 5,431,569 A * | 7/1995 | Simpkins et al. | 434/29 |
| 5,520,259 A | 5/1996 | Onohara et al. | 180/89.12 |
| 5,579,859 A | 12/1996 | Queilhorst et al. | 180/89.13 |
| 5,601,433 A * | 2/1997 | Potter | 434/130 |
| 5,716,037 A * | 2/1998 | Haak | 248/562 |
| 5,853,330 A * | 12/1998 | Engstrand | 472/60 |
| 5,964,310 A * | 10/1999 | Gyllner | 180/89.13 |
| 6,733,293 B1 * | 5/2004 | Baker et al. | 434/55 |

FOREIGN PATENT DOCUMENTS

JP 405170022 A * 7/1993

* cited by examiner

*Primary Examiner*—A. Joseph Wujciak, III
(74) *Attorney, Agent, or Firm*—Jacobson & Johnson

(57) ABSTRACT

A shock-isolation system having a platform for supporting an operator station and a console which can both be fixedly secured to the platform in a relative non-displacement mode with the platform supported by a shock mount that simultaneously isolates the platform including an operator, the operator station and the console as a unitary component from high "g" shock to thereby minimize injury to an operator due to impact with either the operator station, the console or the platform.

9 Claims, 3 Drawing Sheets

USER COUPLED WORKSPACE SHOCK ISOLATION SYSTEM

BACKGROUND OF THE INVENTION

1. Field of the Invention

This invention relates generally to a shock isolation system and, more particularly, to a shock isolation system that simultaneously isolates the platform, the operator, the operator station and the operator's console to thereby minimize operator exposure to shock and vibration.

2. Description of the Related Art

As anyone who has driven an automobile knows, it has long been known that drivers of commercial and pleasure vehicles are protected from vibration and shock by mounting shock absorbers and springs between the frame of the vehicle and the body of the vehicle. These vehicles generally have a two-stage vibration and shock-isolation system. As the vehicles pass over rough terrain the air-inflatable tires provide an air cushion to absorb some of the impact while further impact and vibration is absorbed by springs and shock absorbers that connect the frame to the body of the vehicle. It has also been known to incorporate similar shock systems in agricultural vehicles such as tractors or the like. A typical prior art system for a tractor is shown in U.S. Pat. No. 4,392,546.

In contrast to the commercial and pleasure vehicles which can weigh a few tons, there is a second category of heavier equipment that weighs thousands of tons. In addition, the heavier equipment, which includes combat vehicles such as ships, submarines, tanks and the like is generally supported directly in the water or directly on a land surface with no air cushion. While designers of personal and commercial craft have relied on the combination of air inflatable tires and shock and vibration supports to minimize vibration and shock to the operator, the designers of large water craft, such as military battleships, cannot. Instead, the large mass of the ship is used to partially isolate the operator and the operator's equipment from damage. That is, since the ships are so massive the mass of the ship can absorb a large impact before it is felt by a ship operator or a ship console. In order to further protect the electronic consoles on the large combat ships from the effects of impacts from high gravitational ("g") explosive shocks caused by artillery, bombs, torpedoes or the like as well as from vibration, each of the consoles of the large ships are generally mounted with a set of shock supports that isolate the electronic console from the deck of the ship. It should be pointed out that by explosive shocks it is generally meant to mean shocks which may impart in excess of 5 g's for a duration of 100 milliseconds or more. It is these type of high impact shocks that can cause havoc often resulting in operator injury caused by impact with the console or the deck of the equipment.

A prior art way to prevent injury to the operator on a ship is to include a seat belt to maintain the operator in the operator's chair should the ship supporting the operator station be hit. However, oftentimes the impact on the deck of such shocks is sufficiently great so that even though the operator is restrained, the operator is still injured or killed. In other instances operators, which are not or cannot be restrained, are injured or killed because it is simply not feasible to use a safety belt. Thus, even though the ship might still be functional, the operators required to operate the ship can be so severely injured so as not to be able to operate their stations, thus possibly placing the remaining crew and the ship in jeopardy.

The present invention provides an improvement to the prior art shock isolations system by isolating a deck platform from the ship to form a unitary isolation platform which simultaneously supports both the operator station and the operator's console. The isolation platform generally includes a unitary work deck, which is considerably less massive than the ship, so that the isolation platform can be supported from the deck by conventional vibration and shock absorbers so that the effect of explosive impacts on the deck can be simultaneously isolated from both the operator station and the operator console to thereby minimize the chance of injury or death to the operator from displacement of the equipment relative to the operator.

U.S. Pat. No. 4,128,217 shows a type of small vehicle isolation system that isolates the crew seat for an aircraft. The crew seat is mounted directly to the body of the aircraft, with a set of rails being capable of distorting up to 10 degrees during an impact.

U.S. Pat. No. 4,392,546 shows a system to prevent an operator from the effects of undue motions as the tractor travels over uneven terrain by having an operator station for a tractor cab with the console and the operator mounted on a platform that is coupled to the frame of the tractor.

U.S. Pat. No. 4,892,051 shows a conventional shock-isolation method and apparatus for a large ship mounted device with a shock isolation apparatus mounted between the fire-control system and the deck of the ship.

U.S. Pat. No. 4,987,320 discloses a spring shock system for use in a marine vessel.

U.S. Pat. No. 4,989,684 shows an improved vibration damping and shock absorber for the cab of a truck.

U.S. Pat. No. 5,520,259 shows a vibration-damping and shock-absorbing cabin for construction equipment.

U.S. Pat. No. 5,579,859 discloses springs and shock dampers for supporting a standing surface on a material-handling vehicle.

U.S. Pat. Re. 29,123 discloses a tractor with a unitary cab and control console that are vibrationally isolated from the tractor chassis.

BRIEF SUMMARY OF THE INVENTION

Briefly, this invention comprises a shock-isolation system including an isolatable platform having an operator station and a console which are secured to the platform in a non-displacement mode with the platform supported in a displaceable mode through a shock mount that shockingly isolates the platform to thereby simultaneously isolate the operator, the operator station and the console as a unitary system and to further shockingly isolate the operator, the operator station and the console from each other to thereby minimize injury to the operator due to an external high "g" impact to the support for the shock-isolation system.

DESCRIPTION OF THE PREFERRED EMBODIMENT

Figure 1:
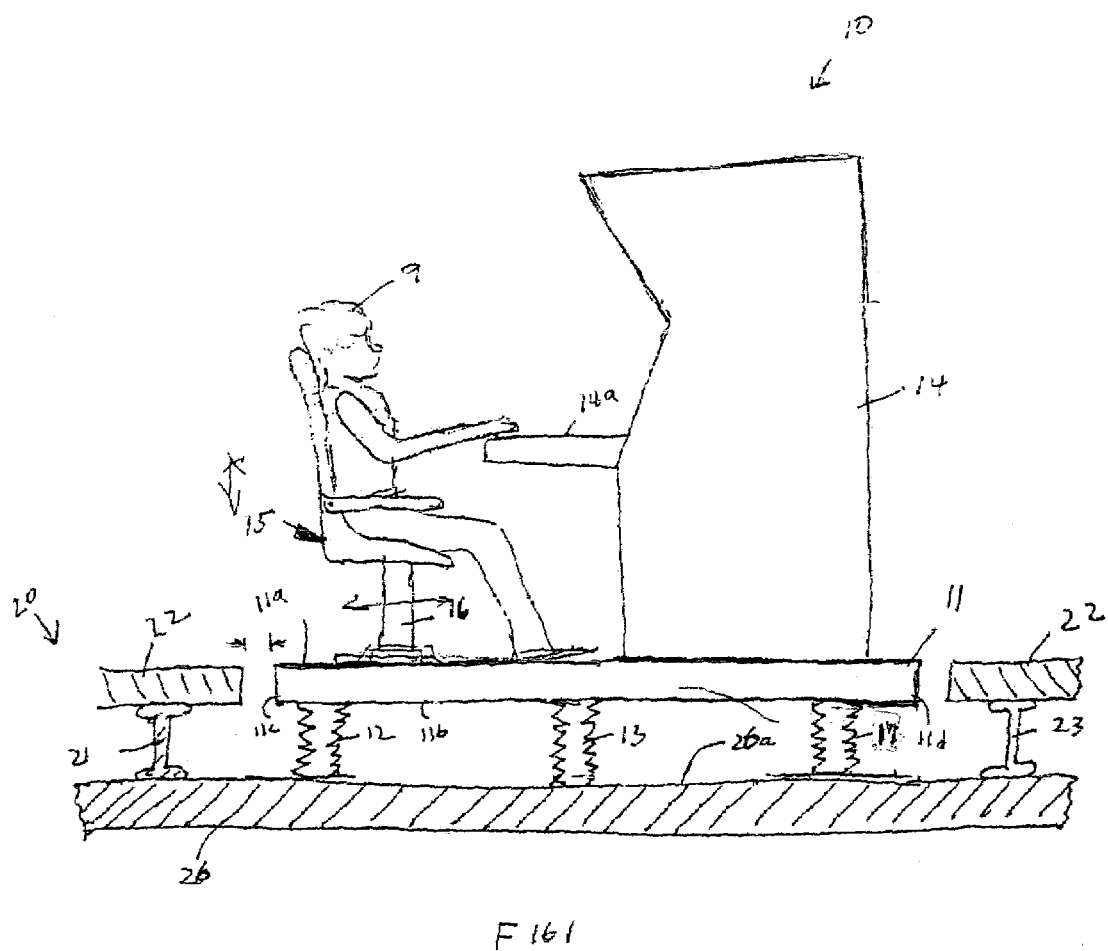
FIG. 1 is a cross-sectional view of a portion of a deck of a ship.

FIG. 1 shows a cross-sectional view of a portion of a ship deck with a console 14 and a console operator station 15 comprising a chair 16 supported by a unitary rigid deck platform 11 with the deck platform 11 mounted substantially coextensive with deck 20 to provide operator access thereto. Typically, console 14 contains electronic equipment such as monitors, computers and the like which are normally individually isolated from a supporting platform by shock and vibration mounts within the console.

The console chair 16 is secured to the top of 11a of platform 11 so as to prevent displacement with respect thereto. Top 11a comprises a foot deck to support either a standing or sitting operator. Similarly, console 14 is secured directly to top 11a of platform 11 so as to prevent displacement with respect thereto. The securing of console 14 and console operator station 15 to the rigid platform 11 prevents relative displacement of the console operator station 15 and the console 14 with respect to each other. By mounting the console operator station 15 proximate console 14, it enables an operator in the console operator station 15 to interact with console 14 while the fixed mounting of the operator station and the console prevents the operator 9 from being impacted by displacement of the console and the operator station relative to one another. Thus, in the present invention, the operator station, the island platform and the console substantially operate as a single dynamic unit, to decrease the chances of injury to an operator thereon.

The elimination of the conventional isolated shock and vibration mounts for each piece of electronic equipment not only reduces the chances of injury to an operator but it also provides greater above-deck usable space since the space in the consoles normally used for shock mounts is eliminated by use of a single set of shock and vibration mounts to support the operators platform 11.

The operator platform 11 is supported by shock mounts 12, 13 and 17 which isolate high "g" shocks present in ship deck 20. While the isolation of the operator from high "g" shocks using only shock absorbers is known, it should be understood that oftentimes shock absorbers are incorporated with vibration dampers so that both shock and vibration can be inhibited in the same mounting device. Thus, the invention is usable with either shock supports alone or shock supports that include vibration attenuators or absorbers. If the shock supports are sufficiently responsive in relation to the inertia of the support platform, the support platform can maintain a substantially fixed spatial orientation, which further lessens the opportunity of injury to the operator since the operator will not normally be fixedly secured to the support platform.

Ship deck 20 is shown to comprise a lower frame 26 having a top surface 26a which supports an upper deck 22 through a set of support beams 21, 23. From FIG. 1 it is apparent that one end 11c of platform 11 is spacedly isolated from top deck 22 by an air gap and opposite end 11d is spaced isolated from top deck 22 by an air gap. Similarly, the opposite sides of platform 11 are spacedly isolated from top deck 22 deck 11 by air gaps. The deck 11 therefor comprises a unitary operator island that can move relative to top deck 22 without directly contacting top deck 22. Consequently, the vibration and shock mounts, which support platform 11 on deck 20, reduce shocks and attenuate vibrations so that the island deck platform 11, including the operator 9 receives little of any effect from a high "g" impact on the ship.

Figure 2:
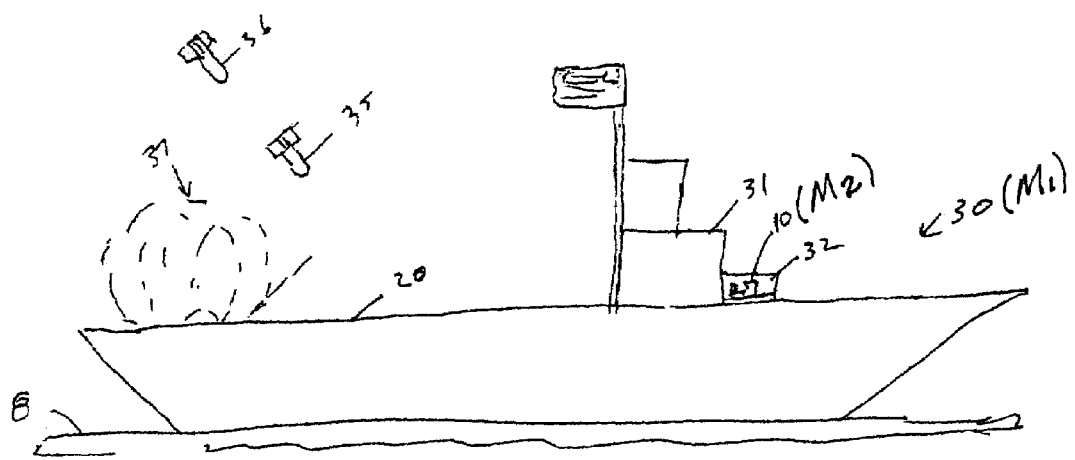
FIG. 2 shows a side view of ship being impacted by explosives.

In order to understand the operation of the present invention, reference should be made to FIG. 2 which shows a ship 30 of mass $M_1$ floating in a body of substantially incompressible fluid such as water 8. The ship includes a pilot house 31 and an operator room 32 which contains the operator and equipment platform 10 shown in FIG. 1. It will be appreciated that the mass $M_2$ of the operator and equipment platform 10 is many hundred-fold less than the mass $M_1$ of the ship.

Ship 30 is shown receiving impacts from a bomb explosion 37 and about to receive further impacts from explosions of bombs 35 and 36. In conventional systems the mass MI of the ship is sufficiently large so as to absorb many impacts without disrupting either an operator or an operator control station. However, impacts do occur which do not destroy the ship but are sufficiently great so that the mass of the ship cannot effectively protect the operator or the operator equipment. In order to respond to these type of hits, previous designs taught the construction of consoles that were isolated from the deck 20 by individual vibration and shock mounts. One of the adverse side effects was that the operators who are standing or sitting on the deck might be hit by either the deck or the console or both as the console responds to an impact. The present invention minimizes operator injury by rigidly coupling the operator control station to the operator console so as to prevent relative movement therebetween. The present provides a four-fold effect: first, the large mass disparity between the ship 30 and the operator platform 11 provides a damping effect on forces transmitted to frame 26; second, the displacement forces on frame 26 are damped by vibration and shock mounts 12, 13 and 17 which serve to attenuate the forces to platform 11; third, if displacement forces are sufficiently large so as not to be effectively diminished by vibration and shock mounts 12, 13 and 17, the coupling of the operator platform 15 to the console with the operator 9 being supported by the platform 11 minimize the chances of injury to the operator 9 due to relative displacement of the equipment with respect to the operator; and fourth, the inertia of the platform and the spaced mounting of the platform 11 from the deck 22 helps maintain the platform in momentarily fixed spatially position so that the operator, who is not fixedly secured to the platform 11, is not thrown into or from the platform.

It will be envisioned that operator safety is enhanced because the inertia of the platform limits the platform and operator movement while the operator, who is now part of the system, tends to move in conjunction with the station components rather than having the components of the station move relative to the platform 11 and the operator 9 which could cause injury to the operator.

In the embodiment shown, the platform 11 is spaced from the ship frame 26 and solely supported therefrom by a shock mount that includes shock attachments 12, 13 and 17. Typically, the platform is made of metal and for a single operator the unitary platform can have a surface area of 20 to 30 square feet.

Figure 3:
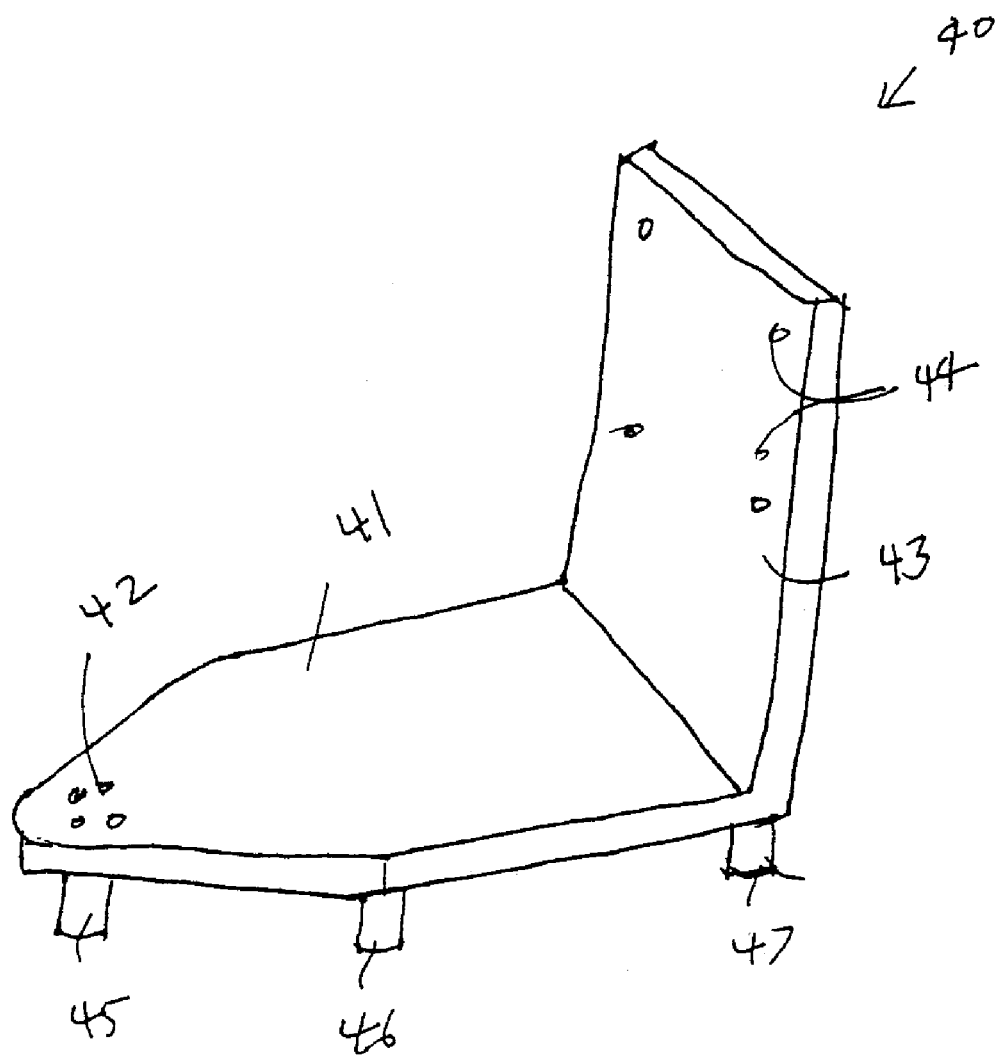
FIG. 3 shows a perspective view of an island platform for vibration and shock isolation mounting.

FIG. 3 shows a perspective view of an island platform 40 for vibration and shock isolation with platform 40 comprising a foot deck 41 having a mounting member 42 for rigidly securing an operator's platform thereon and a wall 43 having mounting members 44 for mounting electronic equipment thereto. Both the operator platform and the electronic equipment are fixedly mounted thereto without the benefit of vibration or shock absorbers. Attached to the underside of island platform 40 is a shock mount comprising a set of vibration and shock absorbers 45, 46 and 47. The concept of vibration and shock absorbers are known in the art and, in one type, generally comprise some type of spring that will yield in response to a sudden force and some type of shock absorber that absorbs shock and also quickly damp out harmful shocks and vibrations.

The present invention provides a combat shock-isolation system for isolating the effects of explosion shocks that could imperil the operation of a ship which is directly supported by a substantially incompressible medium such as a body of water. The ship has a first mass with the ship having a deck thereon. Located thereon is a deck platform having a second mass substantially less than the first mass. The deck platform is spacedly mounted from the deck so as to permit relative displacement between the deck and the ship without contact therebetween. Located on the deck platform is a console which is fixedly mounted on deck platform so as to move with the deck platform. Also located on the deck platform is a console-operator station, which is also fixedly mounted to the deck platform so as to move with the deck platform 11 with the console-operator station mounted proximate the console 14 to enable an operator in the console-operator station 15 to interact with the console. The deck platform 11 is solely supported by a shock mount comprising shock attachments 12, 13 and 17 which is connected to the deck platform and to the ship to support the deck platform 11 so that an explosion shock received by the ship is simultaneously isolated from both the console-operator station and the console by the shock mount supporting the deck platform to thereby prevent the console-operator station and the console to move in relation to each other and thereby minimize injury to the operator thereon.

In a different sense, the invention comprises a spatial isolation system that utilizes the inherent inertia of the unitary platform 11 to momentarily spatially isolate the unitary platform 11 from the effects of high "g" forces. Further, operator safety is obtained by having an operator station 15 and the console 14 fixedly secured to the unitary platform 11 thereby further inhibiting opportunity for operator injury by simultaneously preventing the operator station and the unitary platform from moving relative to one another.

We claim:

1. A shock-isolation system for isolation of shocks comprising:
   a support structure;
   a unitary platform, said unitary platform having an operator station thereon;
   a first mounting member for rigidly securing a console to said unitary platform;
   a shock mount, said shock mount located between said support structure and said unitary platform, said shock mount for supporting said unitary platform in a condition where the sole support for the unitary platform is the shock mount so that the unitary platform is free to remain spatially fixed to isolate the unitary platform from the effects of high "g" shocks with the operator station and the unitary platform further inhibiting opportunity for operator injury by simultaneously preventing the operator station and the unitary platform from moving relative to one another wherein the shock mount provides vibration damping.

2. The shock-isolation system of claim 1 including a second mounting member for securing the operator station thereto.

3. The shock-isolation system of claim 2 wherein the operator unitary platform includes a foot deck for an operator.

4. The shock-isolation system of claim 3 wherein the shock-isolation system is only supported by said shock mount.

5. The shock-isolation system of claim 4 wherein the unitary platform includes an upright wall with said upright wall including the first mounting member.

6. The shock-isolation system of claim 5 wherein the unitary platform is metal.

7. The shock-isolation system of claim 6 wherein the unitary platform has a surface area of about 20 to 30 square feet.

8. The shock-isolation system comprising:
   a support structure;
   a unitary platform, said unitary platform having an operator station thereon;
   a first mounting member for rigidly securing a console to said unitary platform;
   a shock mount, said shock mount located between said support structure and said unitary platform, said shock mount for supporting said unitary platform in a condition where the sole support for the unitary platform is the shock mount so that the unitary platform is free to remain spatially fixed to isolate the unitary platform from the effects of high "g" shocks with the operator station and the unitary platform further inhibiting opportunity for operator injury by simultaneously preventing the operator station and the unitary platform from moving relative to one another, wherein the shock mount simultaneously isolates the operator station and the unitary platform from shock and vibration.

9. The shock-isolation system comprising:
   a support structure;
   a unitary platform, said unitary platform having an operator station thereon;
   a first mounting member for rigidly securing a console to said unitary platform;
   a shock mount, said shock mount located between said support structure and said unitary platform, said shock mount for supporting said unitary platform in a condition where the sole support for the unitary platform is the shock mount so that the unitary platform is free to remain spatially fixed to isolate the unitary platform from the effects of high "g" shocks with the operator station and the unitary platform further inhibiting opportunity for operator injury by simultaneously preventing the operator station and the unitary platform from moving relative to one another, wherein the shock mount dampens vibration and shock to minimize the relative motion between the operator station and the operator.

* * * * *